United States Patent
Webber et al.

[11] Patent Number: 5,450,282
[45] Date of Patent: Sep. 12, 1995

[54] CIRCUIT BREAKER SUPPORT SADDLE FOR AUTOMATED ASSEMBLY

[75] Inventors: Timothy W. Webber, Southington; Robert G. Markowski, Wallingford; Peter F. Cavanaugh, W. Simsbury, all of Conn.

[73] Assignee: General Electric Company, New York, N.Y.

[21] Appl. No.: 239,781

[22] Filed: May 9, 1994

[51] Int. Cl.⁶ ............................................. H02B 1/04
[52] U.S. Cl. ................................. 361/637; 361/650
[58] Field of Search ................. 174/59, 68.2, 708; 361/627, 634, 637, 636, 639, 640, 648, 650, 658; 439/207, 211, 212, 460, 571–574; 248/220.2, 223.3, 224.4, 225.1

[56] References Cited

U.S. PATENT DOCUMENTS

| | | | |
|---|---|---|---|
| 3,858,092 | 12/1974 | Olashaw | 361/650 |
| 4,118,754 | 10/1978 | Duggan | 361/355 |
| 4,242,718 | 12/1980 | Shariff | 361/611 |
| 4,251,851 | 2/1981 | Diersing | 361/363 |
| 4,536,823 | 8/1985 | Ingram | 361/355 |
| 4,646,198 | 2/1987 | Rich | 361/346 |
| 4,740,865 | 4/1988 | Barner | 361/346 |
| 5,046,173 | 9/1991 | Wall, Jr. | 361/353 |

*Primary Examiner*—Gerald P. Tolin
*Attorney, Agent, or Firm*—Richard A. Menelly

[57] ABSTRACT

A circuit breaker support saddle is assembled automatically from three plastic support pieces without welding or using separate fasteners to secure the pieces together. The metal circuit breaker support rails are positioned onto blocks integrally formed on the two outermost pieces to mechanically hold the pieces together as a single unit. The circuit breaker stab support busses are retained within elongated slots formed within the outer edges of the central support piece.

14 Claims, 5 Drawing Sheets

CIRCUIT BREAKER SUPPORT SADDLE FOR AUTOMATED ASSEMBLY

BACKGROUND OF THE INVENTION

Plastic materials are finding increased use within the electrical distribution protection industry in view of the good mechanical and electrical resistance properties of plastic materials such as Noryl which is a trademark of General Electric Company for synthetic thermoplastic resins for molding and extrusion purposes.

U.S. Pat. No. 4,118,754 entitled "Electric Panel Having Molded Base Pan" describes the use of such plastic material for an electric panel assembly for mounting circuit breakers. The assembly uses formations integrally-formed within the assembly for retaining the circuit breaker stab support bus bars.

U.S. Pat. No. 4,740,865 entitled "Extruded Three-Phase Base Pan Configuration for a Load Center" describes a plastic extruded circuit breaker support structure having integrally-formed channels for receiving the circuit breaker stab support bus bars.

To further enhance the use of integrally-formed plastic formations for automated assembly of circuit breaker support assemblies at a substantial savings in time and materials during the manufacturing process, it would be economically advantageous to eliminate the requirements of any metal fasteners whatsoever.

One purpose of the invention is to describe a circuit breaker support saddle that is assembled in an automated process that utilizes formations within the saddle components to position and secure the components without requiring additional metal fasteners.

SUMMARY OF THE INVENTION

A circuit breaker support saddle is assembled automatically from a central plastic support piece and a front and a rear support piece without welding or using separate fasteners to secure the pieces together. The metal circuit breaker support rails include slots that interact with detents integrally formed on the front and rear pieces to mechanically hold the three pieces together as a single unit. The circuit breaker stab support busses are retained within elongated slots formed within the outer edges of the central support piece.

DESCRIPTION OF THE PREFERRED EMBODIMENT

Figure 1:
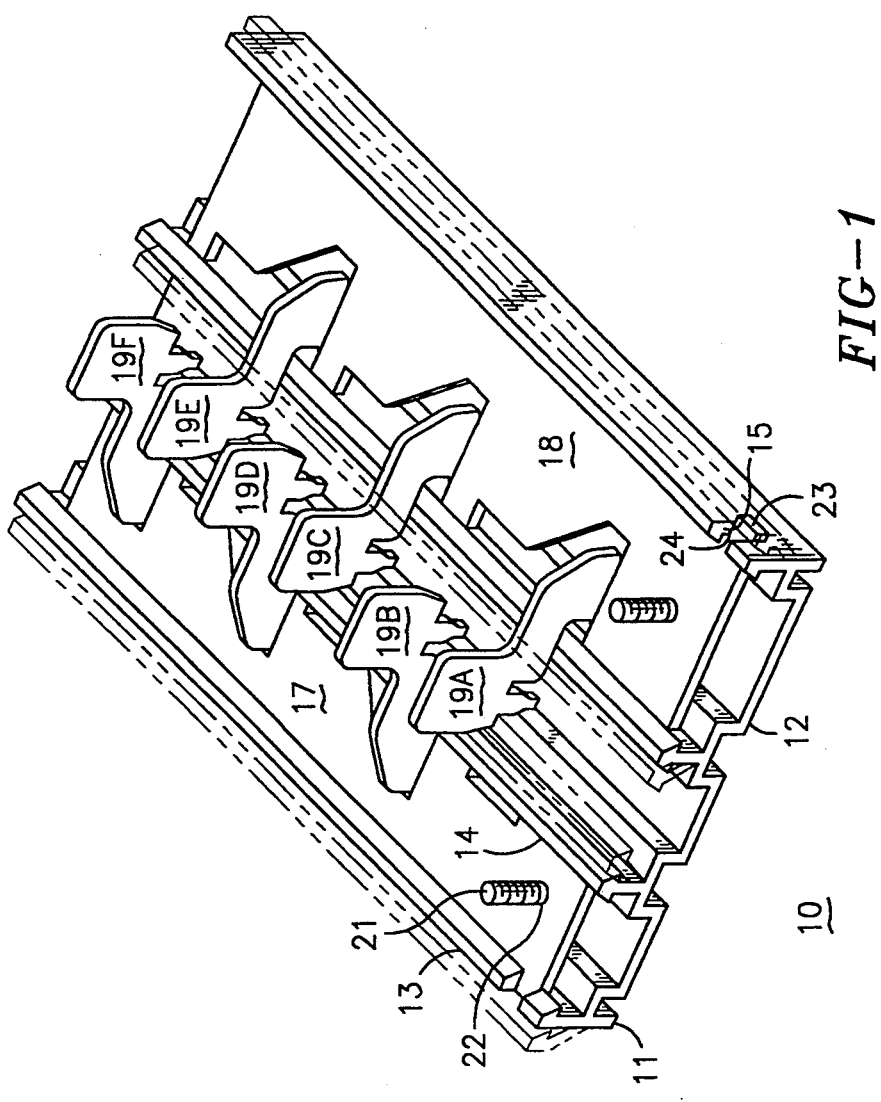
FIG. 1 is a top perspective view of the center support piece used within the circuit breaker support saddle according to the invention.

The support saddle center section 10 shown in FIG. 1 is formed from an extruded plastic piece 11 that includes five linear spacers 12 extending along the bottom surface to separate the saddle from the panel board interior and to provide air transport channels for cooling the saddle. A pair of side rails 13 are formed on the opposing sides of the center section and a pair of center rails 14 are formed inboard the side rails. Elongated slots, as illustrated at 15, extend along the interior-facing sides of the side rails 13 and on both sides of the center rails 14. The bus bars 17, 18 which support the circuit breaker stab connectors 19A-19F, are secured between the center rails and the side rails by slightly displacing the center and side rails from the vertical as illustrated in phantom to allow the bus bars to fit within the elongated slots, then allowing the side rails and center rails to return to their rest positions to trap the edges of the bus bars within the slots. The provision of a locking tab 23 at one end of the bus bars and a corresponding vertical slot 24 in the side rails allows the tabs to swing within the slots when the edges of the bus bars are positioned within the elongated slots 15 to assist in lockingly retaining the bus bars on the plastic base. Prior to securing the bus bars to the plastic base, a threaded lug 21 is inserted within the opening 22 formed within each bus bar to provide electrical attachment to the bus bars.

Figure 2:
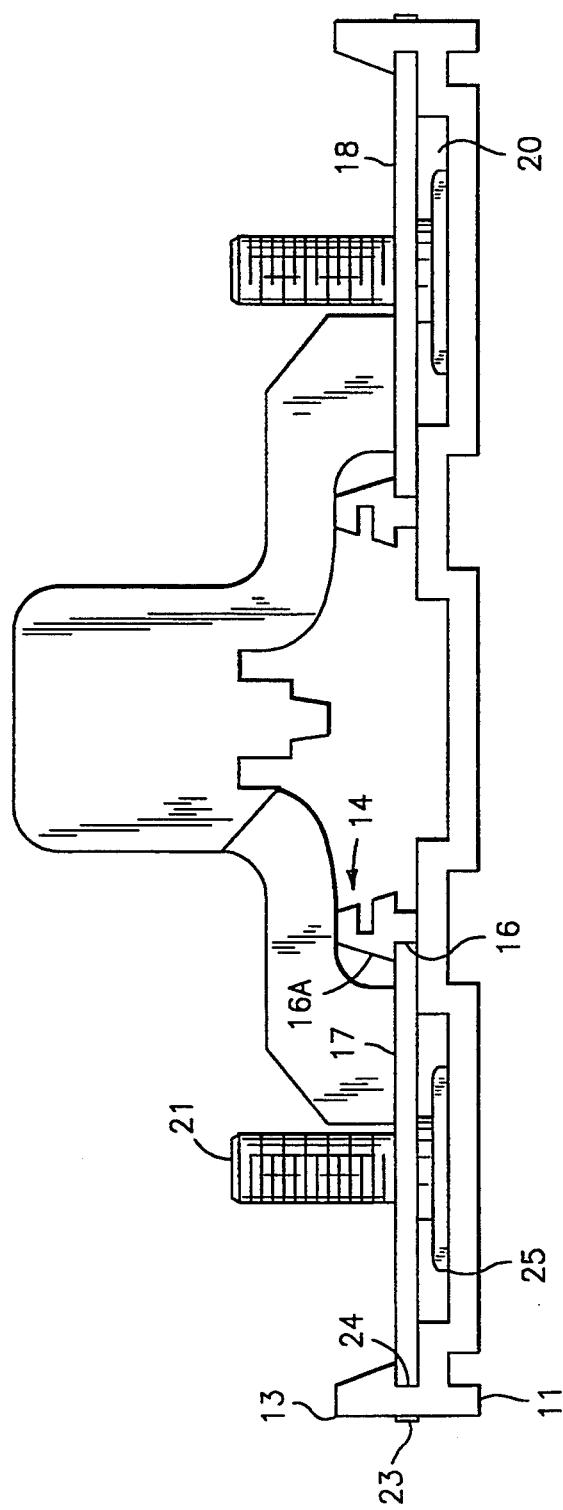
FIG. 2 is an end view of the center support piece of FIG. 1.

As shown in FIG. 2, the flattened ends 25 of the lugs 21 are trapped within the opening 20, formed within the plastic base 11, and the bottom of the bus bars 17 and 18. The locking tabs 23 are shown projecting through the slots 24 in the side rails 13 and the edge of the bus bar 17 is depicted captured under the top edge 16A of the elongated slot 16 within the center rail 14.

Figure 3:
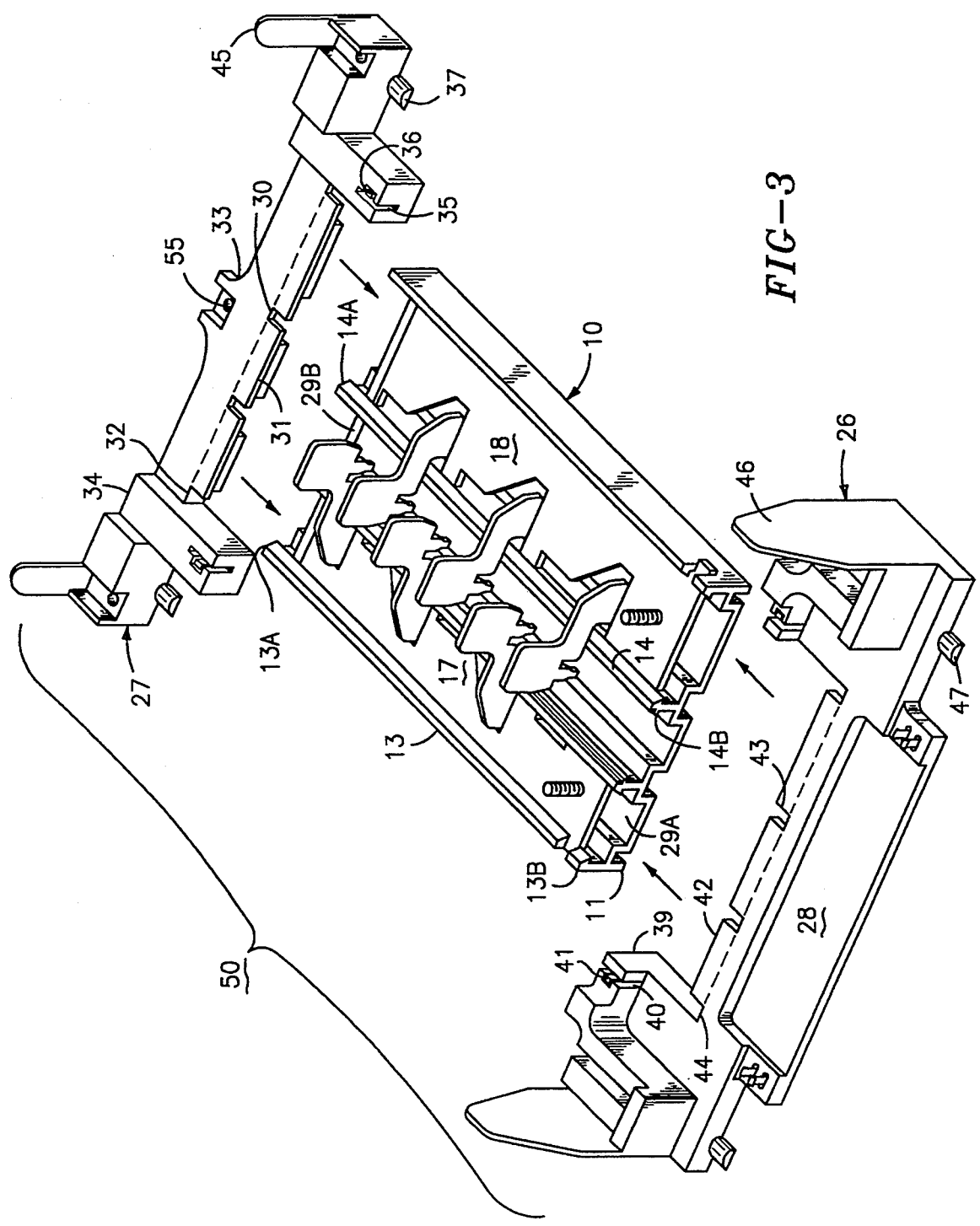
FIG. 3 is a top perspective view of the center support piece of FIG. 2 with the front and rear support pieces in isometric projection.

The center section 10 is shown in FIG. 3 with the bus bars 17, 18 secured to the plastic base 11 such as to define a pair of clearance spaces 29A, 29B at opposite ends. The rear section 27 formed as a single platform 33 of plastic which includes a pair of blocks 34 and upstanding end shields 45 integrally-formed therein. The blocks include a T-shaped slot 35 as viewed from the top with an upstanding tang 36 positioned for moving within the short end of the T in the manner to be described below. The ends 14A, of the center rails 14 are received within corresponding fastening slots 30 formed within the edge of the platform 33 when the rear section 27 is moved into contact with the center section 10 and the shelf 31 formed therein overlaps the clearance space 29B at the ends of the bus bars 17, 18. The slots 32 next to the blocks 34 provide clearance for the ends 13A of the side rails 13. The front section 26 is also formed from a single platform 28 of plastic which includes a pair of blocks 39 and upstanding side shields 46 integrally-formed therein. The blocks include a T-shaped slot 40 as viewed from the top with an upstanding tang 41 positioned for moving within the short end of the T. The ends 14B of the center rails 14 are received within corresponding fastening slots 43 formed within the edge of the platform 28 when the front section 26 is moved into contact with the center section 10 to form the support saddle 50. The shelf 42 formed therein overlaps the clearance space 29A at the ends of the bus bars 17, 18 and the slots 44 next to the blocks 39 provide clearance for the ends 13B of the side rails 13. The semicircular posts 37 formed on the rear section 27 and the semicircular posts 47 formed on the front section 26 are received within corresponding slots which are provided on the interior of the load center or panelboard enclosure (not shown) within which the saddle is attached by means of the thru-hole 55.

Figure 4:
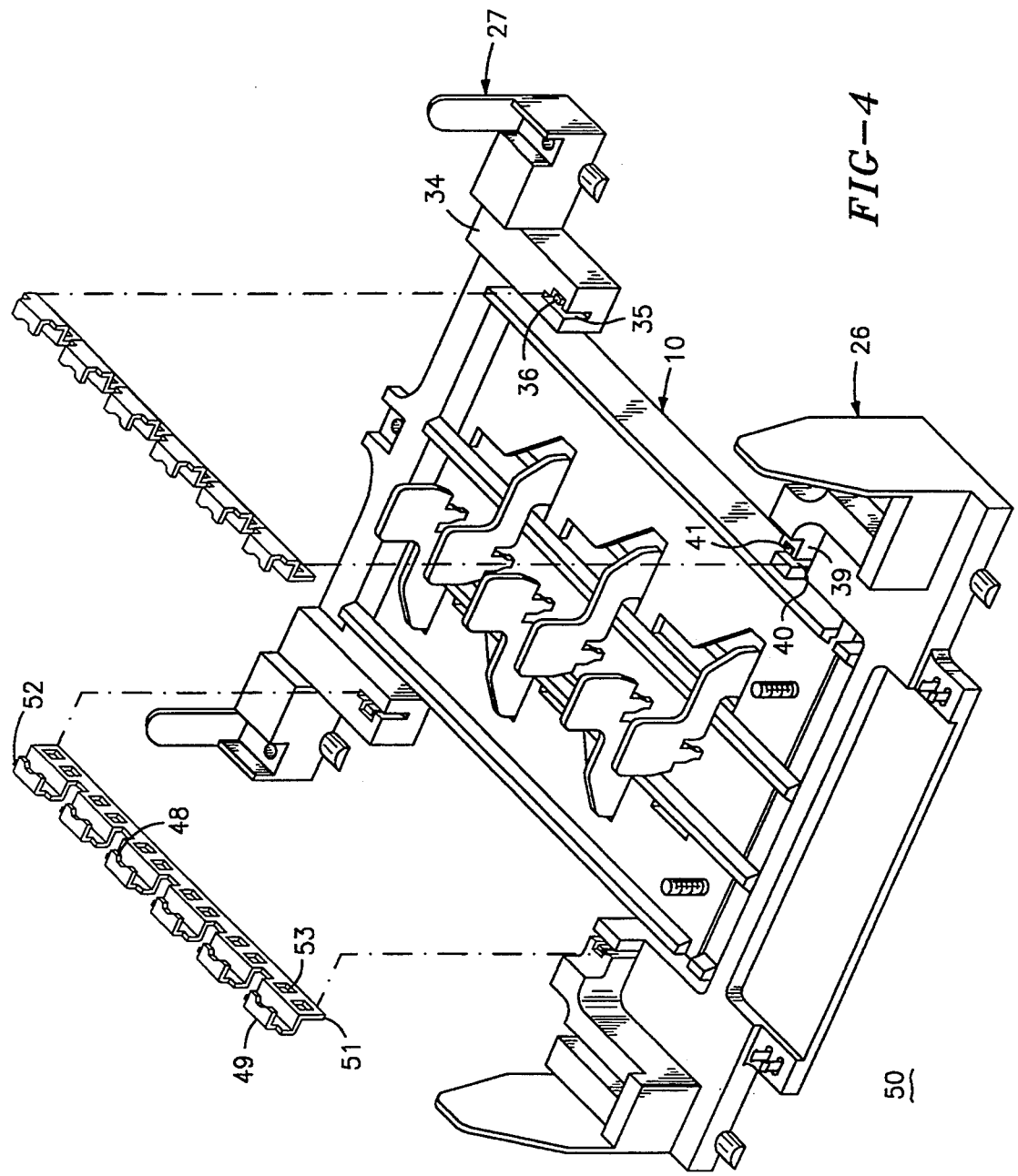
FIG. 4 is top perspective view of the front, rear and center support pieces of FIG. 3 assembled to form the circuit breaker support saddle of the invention with the circuit breaker support rails isometric projection.

The saddle 50 is depicted in FIG. 4 prior to attaching the circuit breaker support rails 49. The support rails include a bottom strap 51 with a series of rectangular slots 53 and a top shelf 52 extending at a right angle therefrom and including a series of circuit breaker support hooks 48 formed therein. The support rails are attached to the front section 26 and the rear section 27 by inserting the bottom strap 51 within the T-shaped slots 35, 40 within the respective blocks 34, 39 such that the tangs 36, 41 engage and retain the rectangular openings 53 to fixedly secure the front, center and rear sections 26, 10, 27 as a unitary support saddle 50' as shown in FIG. 5.

Figure 5:
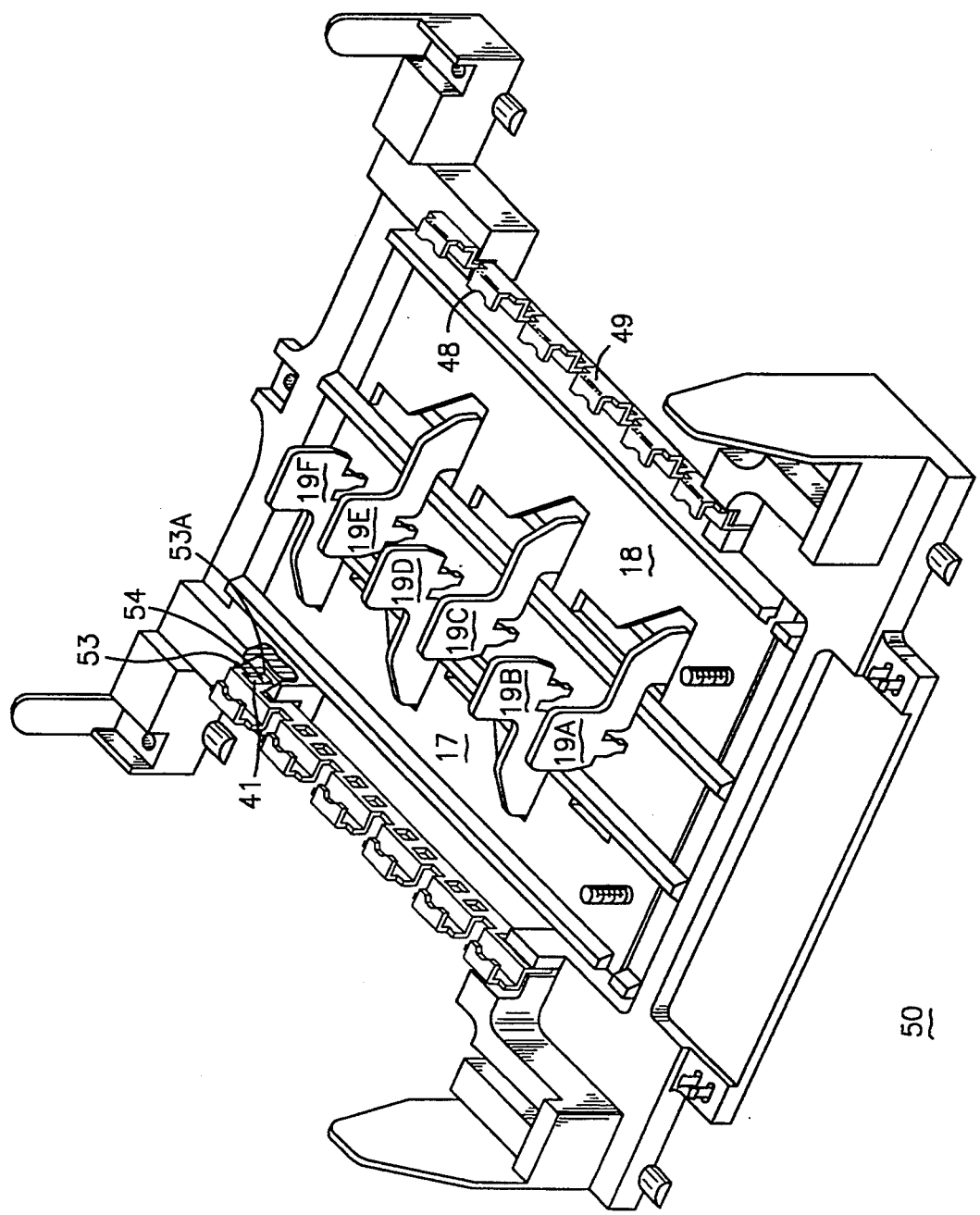
FIG. 5 is top perspective view of the completely assembled circuit breaker support saddle of the invention.

In FIG. 5 the capture of the support rails 49 accurately align the circuit breaker hooks 48 with the associated circuit breaker stab connectors 19A-19F on the bus bars 17, 18. The retention of the support rails is assured by the capture of the bottom edges 53A of the rectangular slots 53 under the hooks 54 formed on the end of the tangs 41.

It is noted herein that no screws, rivets or similar fasteners were used to fasten and secure the components that comprise the circuit breaker support saddle of the invention. This is an important feature of the invention which lends to automated assembly as well as requiring a minimum number of parts.

We claim:

1. A circuit breaker support saddle comprising:
   a center section 10 having side rails 13 and center rails 14 integrally-formed therein:
   an elongated slot 15 formed on one side of said side rails and an opposing elongated slot 16 formed on one side of said center rails and a circuit breaker bus bar 17 extending between one of said side rails and one of said center rails, opposite edges of said bus bar being captured within said elongated slot and said opposing elongated slot to secure said bus bar thereto;
   a first section having first fastening slots 43 on a first edge thereof capturing first ends 14B of said central rails to thereby attach said first section to said center section; and
   a first block 39 upstanding on said first section, said first block including a first shaped slot 40 with a front tang 41 up-standing within said first shaped slot.

2. The circuit breaker support saddle of claim 1 including a vertical slot 24 formed within one end of said one side rail and a locking tab 23 extending from one end of said bus bar, said locking tab being retained within said vertical slot when said bus bar is captured within said elongated slot and said opposing elongated slot.

3. The circuit breaker support saddle of claim 1 wherein said bus bar include a thru-hole 22 and a lug 21 extending through said thru-hole, said lug including a head at one end of said lug being trapped between a top surface of said center section and a bottom surface of said bus bar.

4. The circuit breaker support saddle of claim 1 further including a first shelf 42 defined along said first edge, said first shelf receiving an end part 29A of said center section when said first section is attached to said center section.

5. The circuit breaker support saddle of claim 1 including a rear section 27 having rear fastening slots 30 on a rear edge thereof capturing rear ends 14A of said central rails to thereby attach said rear section to said center section.

6. The circuit breaker support saddle of claim 1 further including a rear shelf 31 defined along said rear edge, said rear shelf receiving an end part 29B of said center section.

7. The circuit breaker support saddle of claim 1 including a front retainer post 47 extending from a bottom part of said front section, said front retainer post adapted for reception within a corresponding front retainer slot formed within a circuit breaker enclosure.

8. The circuit breaker support saddle of claim 1 including a rear retainer post 37 extending from a bottom part of said rear section, said rear retainer post adapted for reception within a corresponding rear retainer slot formed within a circuit breaker enclosure.

9. A circuit breaker support saddle comprising:
   a center section 10 having side rails 13 and center rails 14 integrally-formed therein:
   an elongated slot 15 formed on one side of said side rails and an opposing elongated slot 16 formed on one side of said center rails and a circuit breaker bus bar 17 extending between one of said side rails and one of said center rails, opposite edges of said bus bar being captured within said elongated slot and said opposing elongated slot to secure said bus bar thereto;
   a circuit breaker support rail 49 connected to separable front and rear sections, said support rail comprising a bottom strap 51 connected to separable front and rear blocks and a top shelf 52 having circuit breaker support hooks 48 formed thereon.

10. The circuit breaker support saddle of claim 9 including a plurality of spaced rectangular apertures 53 extending along said bottom strap, said rectangular apertures adapted for receiving and retaining said front and said rear tangs within said front and rear blocks.

11. The circuit breaker support saddle of claim 10 wherein said rectangular apertures include a bottom shelf 53A and said front and rear tangs include a hook 54, whereby said hook captures said bottom shelf to lockingly retain said support rails to said front and rear sections and to securely retain said front and rear sections to said center section.

12. The circuit breaker support saddle of claim 10 wherein said first shaped slot comprises a configuration providing clearance for said front tang.

13. The circuit breaker support saddle of claim 10 wherein said rear shaped slot comprises a configuration providing clearance for said rear tang.

14. A circuit breaker support saddle comprising:
   a center section 10 having side rails 13 and center rails 14 integrally-formed therein;
   an elongated slot 15 formed on one side of said side rails and an opposing elongated slot 16 formed on one side of said center rails and a circuit breaker bus bar 17 extending between one of said side rails and one of said center rails, opposite edges of said bus bar being captured within said elongated slot and said opposing elongated slot to secure said bus bar thereto; and
   a rear block 34 upstanding on said rear section, said rear block including a rear shaped slot 35 with a rear tang 36 up-standing within said rear shaped slot.

* * * * *